Jan. 12, 1926.

A. LOWY

TOOL BOX

Filed Dec. 13, 1924

1,569,659

INVENTOR
A. Lowy
BY
Sigmund Herzog
ATTORNEY

Patented Jan. 12, 1926.

1,569,659

UNITED STATES PATENT OFFICE.

ADOLPH LOWY, OF NEW YORK, N. Y.

TOOL BOX.

Application filed December 13, 1924. Serial No. 755,741.

*To all whom it may concern:*

Be it known that I, ADOLPH LOWY, a citizen of the United States, and resident of the city of New York, in the county of Bronx and State of New York, have invented certain new and useful Improvements in Tool Boxes, of which the following is a specification.

The present invention relates to improvements in tool boxes, more particularly to a device of this general character especially designed and adapted for use in connection with the running board of an automobile.

The tools needed for small repairs and for the adjustment of parts of an automobile are usually carried under the front seat of the automobile. When, therefore, a tool is needed, the front seat of the automobile must be removed in order to gain access to the compartment below the same. This is frequently annoying particularly in view of the fact that, even for the smallest adjustment or repair, the occupants of the front seat of the automobile must step out of the same. In some instances a tool box is carried on the running board of the automobile, usually an ordinary receptacle having a cover. This receptacle has a single compartment, into which the tools are placed indiscriminately. An arrangement of this type is objectionable because the tools cannot be found readily.

The main object of the present invention is to provide a tool box which overcomes the difficulties above referred to, and which is simple in construction, durable in use and capable of manufacture on a commercial scale, or in other words one which is not so difficult to make as to be beyond the reasonable cost of such a contrivance.

A further object of the invention is to provide a tool box of the character mentioned, the closing member of which does not project beyond the running board and does, therefore, not interfere with the proper operation of the automobile.

With these and other objects in view, which will more fully appear as the nature of the invention is better understood, the same consists in the combination, arrangement and construction of parts hereinafter described, pointed out in the appended claim and illustrated in the accompanying drawings, it being understood that many changes may be made in the size and proportion of the several parts and details of construction within the scope of the appended claim, without departing from the spirit or sacrificing any of the advantages of the invention.

One of the many possible embodiments of the invention is illustrated in the accompanying drawings, in which:—

Figure 1:
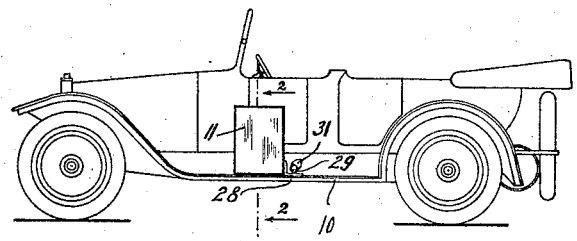
Figure 2:
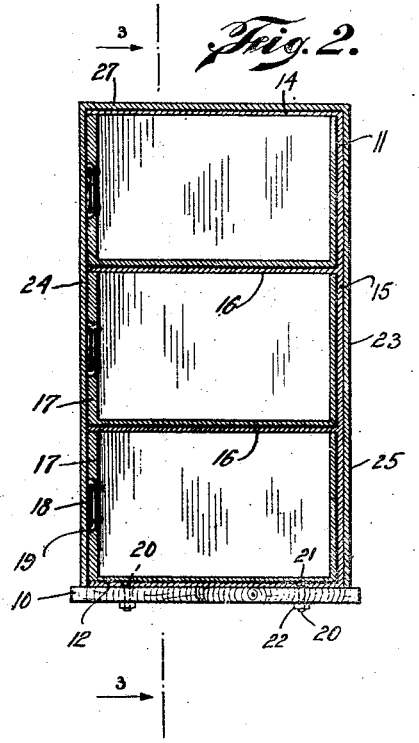
Figure 3:
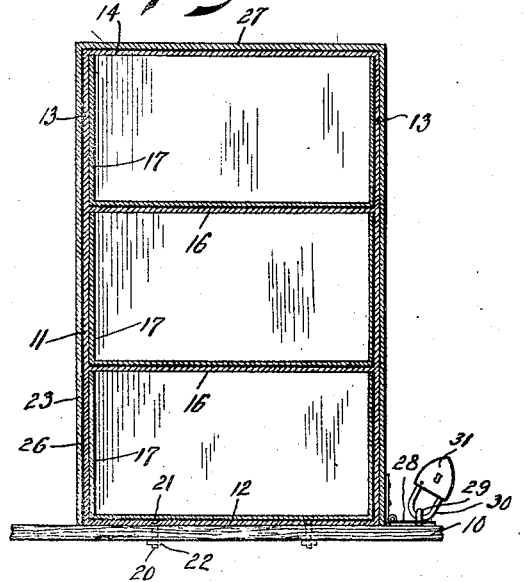

Figure 1 is a side elevational view of an automobile provided with a tool box constructed in accordance with the present invention; Fig. 2 is a section taken on line 2—2 of Fig. 1, on a larger scale; and Fig. 3 is a section taken on line 3—3 of Fig. 2.

In the drawings, the numeral 10 indicates one of the running boards of an automobile. To this running board is attached, in a manner hereinafter to be described, a preferably rectangular casing 11, comprising a bottom 12, side walls 13, a top 14 and a rear wall 15. The casing may be made of any suitable material, for instance wood, and its elements may be united in any preferred manner. The casing is provided with horizontal partitions 16, which divide the same into a plurality of compartments. Into each compartment is fitted a drawer 17, the top of which is open. For the purpose of facilitating the withdrawal of the drawers from their respective compartments, the front wall of the same may be provided with a suitable means by which the drawer may be taken hold of. In the case illustrated in the drawings, there is attached to the front wall of each drawer a flap 18, that may be folded into a recess 19 in the said front wall. The casing is attached to the running board, for instance, by a plurality of screw bolts 20, the heads 21 of which are, preferably, countersunk in the bottom 12 of the casing. These bolts extend through the running board and are engaged by nuts 22, which abut against the underface of the running board.

The casing and the drawers therein are enclosed by a housing 23, that consists of a front wall 24, a rear wall 25, side walls 26 and a top 27. The inner dimensions of this housing are, preferably, slightly larger than the outer dimensions of the casing 11, so that the said housing may be conveniently slipped over the said casing, it resting then on the running board 10. For the purpose of preventing unauthorized access to the tool box, the housing may be locked to the running board. Any suitable means may be employed for this purpose. In the case illustrated, a hasp 28 is hinged to one of the side walls 26 of the housing adjacent its open bottom. This hasp is adapted to be passed over a staple 29, which is driven into the running board 10, and with this staple is engaged the shackle 30 of a pad-lock 31.

In use, the tool box is mounted upon the running board so as not to interfere with the operation of the doors of the automobile. The depth of the tool box is, preferably, smaller than the width of the running board, so as not to project beyond the latter. The tools are arranged in the several drawers, and the same inserted into the compartments of the casing 11, the housing 23 being then slipped over the casing and secured in place by means of the pad-lock.

It is obvious that convenient access can be had to any one of the drawers without disturbing the position of the others in their respective compartments.

What I claim is:—

The combination with a support, of a casing fixed thereto having an open front, partitions dividing said casing into a plurality of compartments, a drawer slidable in each compartment, a bottomless housing adapted to be slipped over said casing and entirely enclosing the latter, and coacting means on said support and said housing for locking the latter in position on said casing.

Signed at New York, in the county of New York, and State of New York, this 22nd day of August, A. D. 1924.

ADOLPH LOWY.